United States Patent [19]

Ling

[11] Patent Number: 5,216,692
[45] Date of Patent: Jun. 1, 1993

[54] METHOD AND APPARATUS FOR ADJUSTING A POWER CONTROL THRESHOLD IN A COMMUNICATION SYSTEM

[75] Inventor: Fuyun Ling, Jamaica Plains, Mass.

[73] Assignee: Motorola, Inc., Schaumburg, Ill.

[21] Appl. No.: 860,878

[22] Filed: Mar. 31, 1992

[51] Int. Cl.$^5$ .............................................. H04K 1/00
[52] U.S. Cl. .......................................... 375/1; 380/41
[58] Field of Search .............................. 375/1; 380/41

[56] References Cited

U.S. PATENT DOCUMENTS

| | | | |
|---|---|---|---|
| 4,208,739 | 6/1980 | Lu et al. .................................. | 375/2 |
| 4,811,357 | 3/1989 | Betts et al. . . | |
| 4,896,353 | 1/1990 | Dehgani et al. ...................... | 380/28 |
| 4,901,307 | 2/1990 | Gilhousen et al. . . | |
| 5,054,066 | 10/1991 | Riek et al. ............................. | 380/30 |
| 5,056,105 | 10/1991 | Darmon et al. . . | |
| 5,056,109 | 10/1991 | Gilhousen et al. . . | |
| 5,101,501 | 3/1992 | Gilhousen et al. . . | |
| 5,103,459 | 4/1992 | Gilhousen et al. . . | |
| 5,109,390 | 4/1992 | Gilhousen et al. . . | |

OTHER PUBLICATIONS

"CDMA Power Control For Wireless Networks", Jack M. Holtzman, *Proceedings of 2nd WINLAB Workshop on 3rd Generation Wireless Interface Networks* in East Brunswick, N.J., Oct. 1990, pp. 264-273.

"CDMA Power Control, Interleaving, and Coding", Floyd Simpson and Jack Holtzman, *Proceedings of ICC '91*, pp. 362-367.

Dixon, Robert C., *Spread Spectrum Systems 2nd Ed.*, John Wiley & Sons, New York, N.Y., 1984 Chapters 1 and 2, pp. 1-55.

Sklar, Bernard, *Digital Communications: Fundamentals and Applications*, Prentice Hall, Englewood Cliffs, N.J., 1988, Chapters 5 and 6 pp. 245-380.

"Two Classes of Convolutional Codes Over GF(q) for q-ary Orthogonal Signaling", William E. Ryan and Stephen G. Wilson, *IEEE Transactions on Communications*, vol. 39, No. 1 (Jan. 1988), pp. 30-40.

"On the System Design Aspects of Code Division Multiple Access (CDMA) Applied to Digital Cellular and Personal Communication sNetworks", Allen Salmasi and Klein S. Gilhousen, *Proceedings of 41st Vehicular Technology Conference* in St. Louis, Mo., May 19-22, 1991, pp. 57-62.

"The Weight Spectra of Some Short Low-Rate Convolutional Codes", Jean Conan, *IEEE Transactions on Communications*, vol. COM-32, No. 9, (Sep. 1984), pp. 1050-1053.

"Performance of Convolutional Codes with Interleaving in the Interference Limited Rayleigh Fading Channel", Li Fung Chang and Sirikiat Ariyavisitakul, *Proceedings of 41st Vehicular Technology Conference* in St. Louis, Mo., May 19-22, 1991, pp. 812-816.

*Primary Examiner*—David Cain
*Attorney, Agent, or Firm*—Shawn B. Dempster

[57] ABSTRACT

A method and apparatus is provided for maintaining received signal power levels at an average level when a signal power estimate is on average similar to the average of actually received signal power levels. The maintaining of the received signal power levels is accomplished by generating an estimate of the power of a received signal. Subsequently, a difference signal is generated by subtracting the estimated received signal power from a predetermined reference signal power. Finally, a signal power control threshold is adjusted as a function of the difference signal.

24 Claims, 3 Drawing Sheets

METHOD AND APPARATUS FOR ADJUSTING A POWER CONTROL THRESHOLD IN A COMMUNICATION SYSTEM

FIELD OF THE INVENTION

The present invention relates to communication systems and, more particularly, to a method and apparatus for adjusting a power control threshold in a communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to-point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g. cellular radio telephone communication systems). These point-to-multipoint systems are also termed Multiple Address Systems (MAS).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology a cost-effective way of building the hardware has been developed.

To transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e. subscriber units) which require active service over a communication channel for a short or discrete portion of the communication channel resource rather than continuous use of the resources on a communication channel. Therefore, communication systems have been designed to incorporate the characteristic of communicating with many remote units on the same communication channel. These systems are termed multiple access communication systems.

One type of multiple access communication system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread spectrum communication techniques exist, including:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

As previously mentioned, spread spectrum communication systems can be multiple access systems communication systems. One type of multiple access spread spectrum system is a code division multiple access (CDMA) system. In a CDMA system, communication between two communication units e.g., a central communication site and a mobile communication Unit is accomplished by spreading each transmitted signal over the frequency band of the communication channel with a unique user spreading code. Due to this spreading transmitted signals are in the same frequency band of the communication channel and are separated only by unique user spreading codes. These unique user spreading codes preferably are orthogonal to one another such that the cross-correlation between the spreading codes is approximately zero. CDMA systems may use direct sequence or frequency hopping spreading techniques. Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are not enhanced.

It will be appreciated by those skilled in the art that several different spreading codes exist which can be used to separate data signals from one another in a CDMA communication system. These spreading codes include but are not limited to pseudo noise (PN) codes and Walsh codes. A Walsh code corresponds to a single row or column of the Hadamard matrix. For example, in a 64 channel CDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio usually expressed as bit energy per noise density ($E_b/N_o$), to recover the signal at the cost of expending more bandwidth than would otherwise be necessary to transmit the data signal. For example, Walsh codes can be used to channel code a data signal prior to modulation of the data signal for subsequent transmission. Similarly PN spreading codes can be used to channel code a data signal.

A typical spread spectrum transmission involves expanding the bandwidth of an information signal, transmitting the expanded signal and recovering the desired information signal by remapping the received spread spectrum into the original information signals bandwidth. This series of bandwidth trades used in spread spectrum signaling techniques allow a communication system to deliver a relatively error-free information signal in a noisy signal environment or communication channel. The quality of recovery of the transmitted information signal from the communication channel is measured by the error rate (i.e., the number of errors in the recovery of the transmitted signal over a particular time span or received bit span) for some $E_b/N_o$. As the error rate increases the quality of the signal received by the receiving party decreases. As a result, communication systems typically are designed to limit the error rate to an upper bound or maximum so that the degradation in the quality of the received signal is limited.

In CDMA spread spectrum communication systems, the error rate is related to the noise interference level in the communication channel which is directly related to number of simultaneous but code divided users within the communication channel. Thus, in order to limit the maximum error rate, the number of simultaneous code divided users in the communication channel is limited. However, the error rate is also affected by the received signal power level. In some spread spectrum communication systems (e.g., cellular systems) a central communication site typically attempts to detect or receive more than one signal from a particular band of the electromagnetic frequency spectrum.

The central communication site adjusts the receiver components to optimally receive signals at a particular received signal power threshold value. Those received signals having a received signal power level at or near the particular power threshold level are optimally received. In contrast those received signals not having a received signal power level at or near the particular power threshold level are not optimally received. A non-optimally received signal tends to have a higher error rate or interfere with received signals from other users. This higher error rate can result in the communication system further limiting the number of simultaneous users in the communication channel associated with the central communication site. Thus, it is desirable to maintain the received signal power level at or near the particular power threshold level. This can be accomplished by adjusting the signal power level of transmitters attempting to transmit to the central communication site. Therefore, by using power control schemes to maintain the received signal power levels at a particular power threshold level the number of simultaneous users in a communication channel can be maximized for a particular maximum error rate limit.

However, a need exists for a way to compensate for a mobile communication unit's velocity (i.e., speed that a mobile cellular phone is moving). It will be appreciated by those skilled in the art that a power control system for a mobile unit will behave differently at different mobile unit speed levels. Further a power control system is basically a nonlinear feedback system. Furthermore, the power control system would, in general, have different gain for different input frequency. Thus, the uncompensated power control system will have different gain and result in different average received signal power level, because the frequency contents of the input to such a power control system, i.e., the instantaneous receiver power, is different for each different mobile unit (vehicle) speed. Through the use of compensation for a more accurate power control scheme, the number of simultaneous users in a communication channel can be increased over the number of simultaneous users in a communication channel using a less accurate power control scheme while maintaining the same maximum error rate limit.

SUMMARY OF THE INVENTION

A method and apparatus is provided for maintaining received signal power levels at an average level when a signal power estimate is on average similar to the average of actually received signal power levels. The maintaining of the received signal power levels is accomplished by generating an estimate of the power of a received signal. Subsequently, a difference signal is generated by subtracting the estimated received signal power from a predetermined reference signal power. Finally, a signal power control threshold is adjusted as a function of the difference signal.

DETAILED DESCRIPTION

Figure 1:
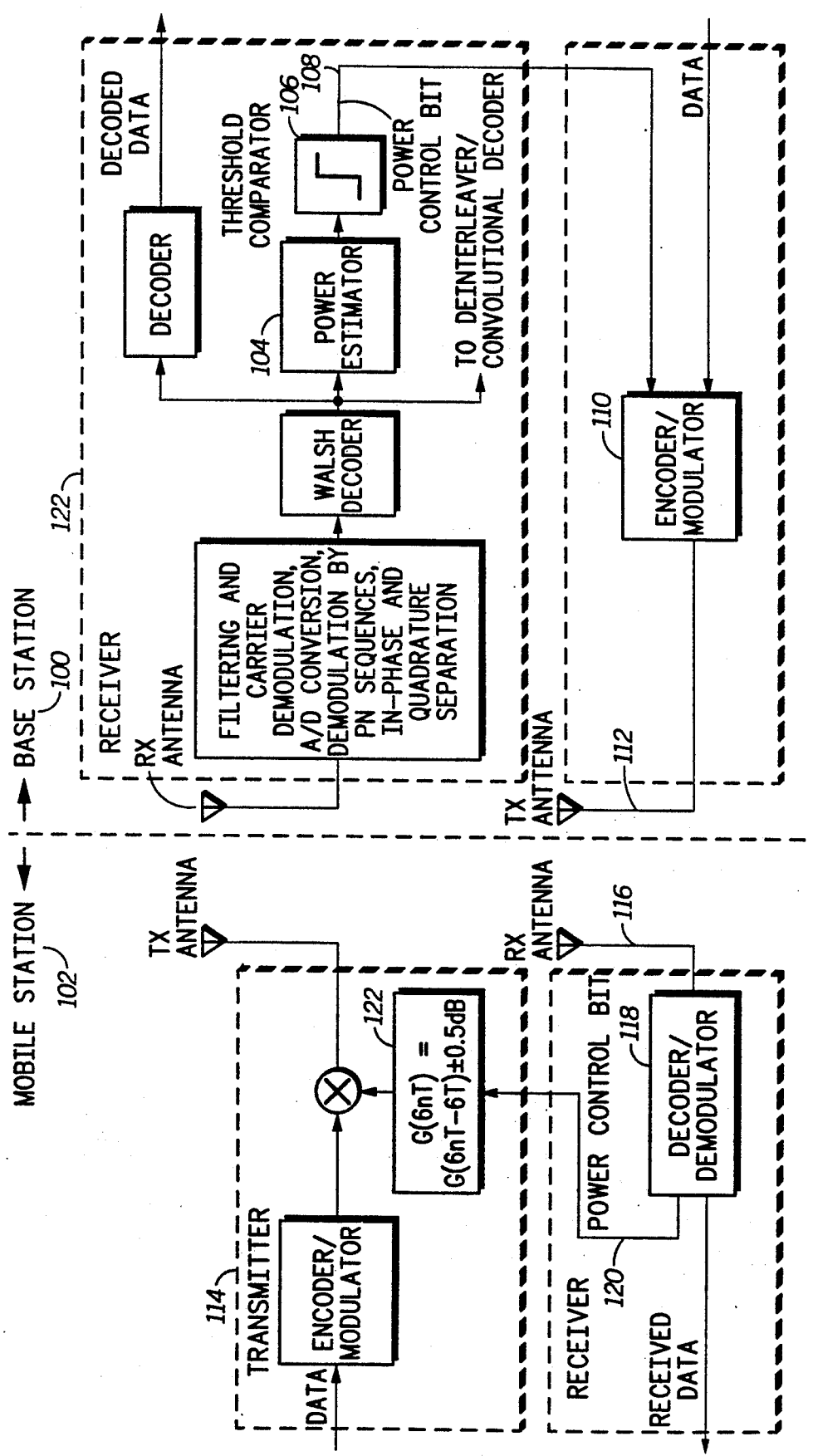
FIG. 1 is a block diagram showing a preferred embodiment communication system which uses orthogonal coding and power control.

Referring now to FIG. 1, a preferred embodiment closed-loop power control system in a communication system is shown. The power control system is for a reverse channel (i.e., the base communication site 100 adjusts the transmit signal power of the mobile station 102). The base station 100 receiver estimates the received signal power transmitted by the mobile station 102 of a particular user. In the preferred embodiment, power is preferably estimated 104 every 1.25 ms, i.e., during the time period (T) of 6 Walsh words. Several power estimates can be averaged together to get a long term average power estimate. The power estimate is compared 106 to a threshold. A control indicator (e.g., a bit or plurality of bits) is generated 108 based on the result of the comparison. If the estimate is larger than the threshold, the power control indicator is set to be one. Otherwise it is set to be zero. The power control indicator is encoded 110 and transmitted 112 via the forward channel. The encoding may include spreading the power control indicator with a spreading code prior to transmission over the communication channel. To reduce the burden to the forward channel, preferably only one power control indicator is transmitted every 1.25 ms. As a result, the mobile station 102 detects the power control indicator from within a signal received from over the communication channel and subsequently will either increase or decrease 122 its transmitter 114 power every 1.25 ms according to the power control indicator 120 received. The detection of the power control indicator may involve despreading the received signal with a spreading code. The transmitter 114 will increase the transmission power if the received control indicator is a zero. Otherwise, it 114 will decrease the transmission power. The step of power increase or decrease preferably is between 0.2 to 0.8 dB, and the power change within every 12.5 ms is held to less than 5 dB. The time delay of the mobile station 102 response after receiving the power control indicator should be no larger than 2 ms.

From the above description, it can be seen that the power control system is a nonlinear feedback control system with delay. The purpose of such a control system is to track the instantaneous received signal power change, if possible. It should also maintain the average received signal power on a fixed level when the instantaneous power tracking cannot be achieved. Obviously, if all the average mobile transmitter's 102 powers at the base station 100 receiver input are equal to each other, the signal to noise ratio of a particular mobile station 102 can be maintained above a pre specified value by not allowing the number of mobile stations in the cell to exceed a certain limit. The signal to noise ratio can be maintained in this manner because the noise, or interference, for a particular received signal is mainly due to signals from other mobile stations. If all the average receiver signal power levels are the same, then the signal to noise ratio at the input of any receiver is simply equal to $10Log_{10}N$ (dB), where N is the effective number of transmitting mobile stations.

Although it is possible to perform power control based on the signal to noise ratio for a particular receiver, a power control system solely based on signal to noise ratio may become unstable. More precisely, because the received signal for one mobile station causes interference for others, then increased transmitter power from one mobile station means increased interference for the received signals from other mobile stations. Namely, adjustment of one mobile station's power will affect the signal to noise ratio of other mobile stations. It will be very difficult to select a desired signal to noise ratio value for all the mobile stations. Even if this is possible, such a system will be unstable. For instance, assume that mobile station A's signal power is increased for some reason. That station's power increase will cause a decrease in the signal to noise ratio in all of the received signals from other mobile stations. To maintain a proper signal to noise ratio, these mobile stations must increase their transmitter powers and this will cause mobile station A to increase it's power again. This obviously forms an unstable positive feedback loop.

The performance of the power control system greatly depends on the performance of the received signal power estimator. However, once a good received power estimator is found, the power control system should still be enhanced. The power control system will behave differently under different mobile station speed. Since, the power control system is basically a nonlinear feedback system, it would, in general, have different gain for different input frequency. Since the frequency contents of such a system's input, i.e., the instantaneous receiver power, are different for different mobile station speed, the power control system will have different gain and result in different average received signal power level. However, when the long time average of the power estimator output $\overline{P}(n)$ is very close to the measured actual average received signal power, the average received signal power may be maintained by adjusting the threshold according to the long term average of the power estimator output.

Figure 2:
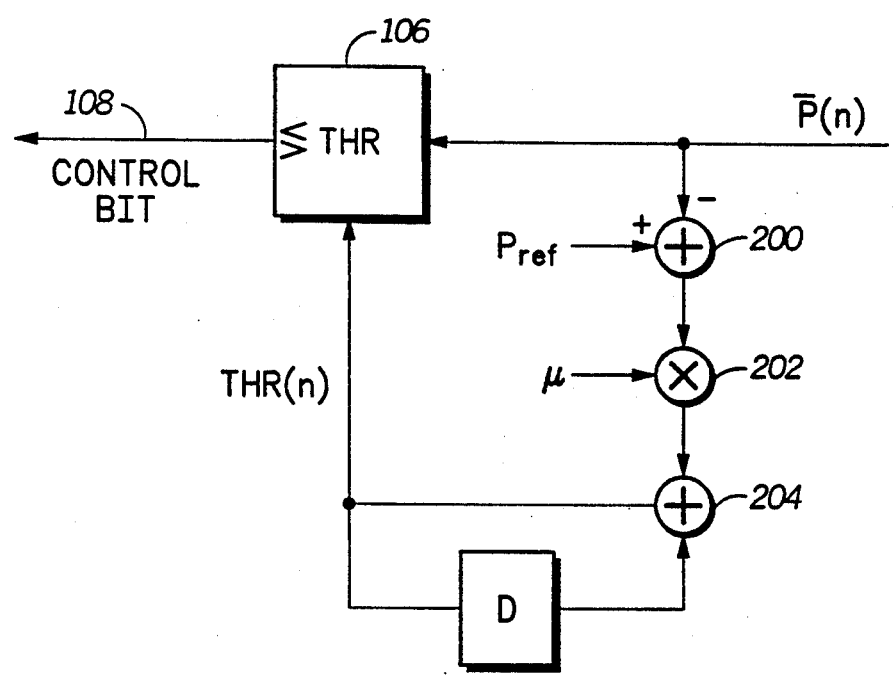
FIG. 2 is a block diagram showing a preferred embodiment power control threshold adjustment apparatus.

A simplified preferred embodiment implementation is shown in FIG. 2. In this implementation, a Least Mean Squared (LMS) adaptive algorithm to adjust the power control threshold and to perform averaging at the same time can be used. Every time a power estimate $\bar{P}(n)$ is generated, it is subtracted 200 from a fixed reference level $P_{ref}$. The difference signal 202 is used to update 204 the power control threshold THR(n). Specifically, the power control threshold is updated according to the following function:

$$THR(n) = THR(n-1) + \mu[P_{ref} - \bar{P}(n)]$$

where,
n = a moment in time;
THR(n) = signal power control threshold at time n;
$\mu$ = a threshold adaption step size which controls the averaging time constant;
$P_{ref}$ = a predetermined reference signal power; and
$\bar{P}(n)$ = an estimated received signal power at time n.
Preferably $\mu = 0.001$ to achieve a time constant $\tau$ of 1.25 second ($\tau = T/\mu$). Since, such a time constant $\tau$ is much longer than the response time T (i.e., the estimation time interval) of the preferred embodiment power control feedback system, the adaptation of power control threshold will not interfere with the normal operation of the power control system. However, this adaption can reduce the long term average power level variation for mobile unit's 102 traveling at different speeds.

Figure 3:
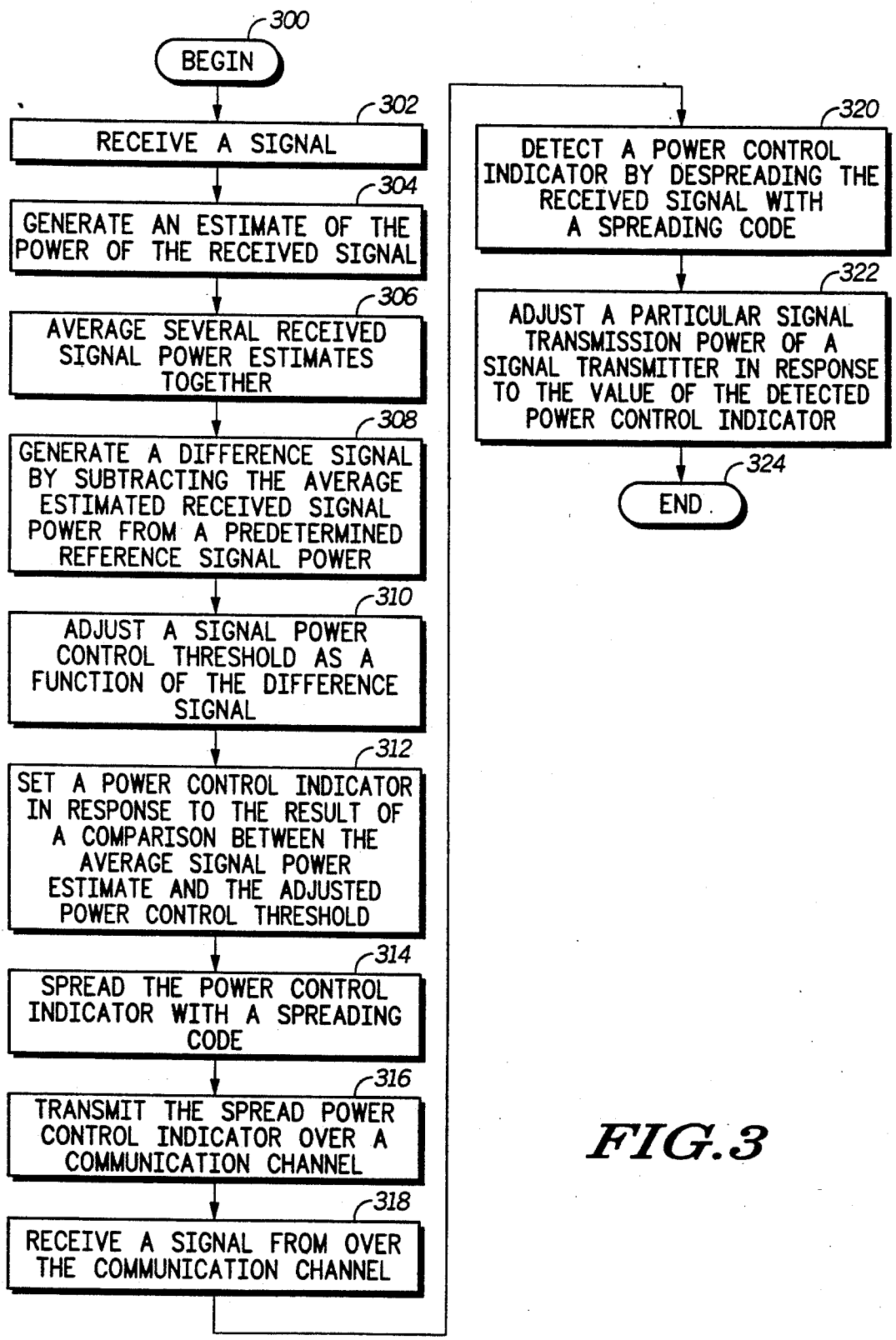
FIG. 3 is flowchart detailing the power control threshold adjustment steps performed by the preferred embodiment communication system of FIGS. 1 and 2.

Thus, a communication system for using adaptable signal power control thresholds has been described above with reference to FIGS. 1 and 2. A flowchart which summarizes the steps performed by the power control system shown in FIGS. 1 and 2 is shown in FIG. 3. The signal power control system begins 300 by receiving a signal 302 at the base station 100 receiver 122. An estimate of the power of the received signal $\bar{P}(n)$ is generated 104, 304. Subsequently, the new estimate of the signal power $\bar{P}(n)$ may be averaged together 306 with previous estimates of the signal power. A difference signal 202 is generated 308 by subtracting the average estimated received signal power $\bar{P}(n)$ from a predetermined reference signal power $P_{ref}$. Subsequently, a signal power control threshold THR(n) is adjusted 310 as a function of the difference signal. Subsequently a power control indicator 108 is set 312 in response to a comparison between the average signal power estimate $\bar{P}(n)$ and the adjusted power control threshold THR(n). The power control indicator 108 is spread 110, 314 with a spreading code. The spread power control indicator 108 is transmitted 112, 316 over a communication channel. Subsequently, a mobile station 102 receives 116, 318 a signal from over the communication channel. A power control indicator 120 is detected 118, 320 by despreading the received signal with a spreading code. A particular signal transmission power of a signal transmitter 114 is adjusted 122, 322 in response to the value of the detected power control indicator 120 which completes or ends 324 one loop of the preferred embodiment power control system.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system power control scheme as described were directed to CDMA spread spectrum signals transmitted over a radio communication channel. However, as will be understood by those skilled in the art, the power control techniques described and claimed herein can also be adapted for use in other types of transmission systems like those based on TDMA and FDMA. In addition the communication channel could alternatively be an electronic data bus, wireline, optical fiber link, or any other type of communication channel.

What is claimed is:

1. An apparatus for maintaining received signal power levels at an average level when a signal power estimate on average is similar to the average of actually received signal power levels, comprising:
    (a) estimating means for generating an estimate of the power of a received signal;
    (b) difference means, operatively coupled to the estimating means, for generating a difference signal by subtracting the estimated received signal power from a predetermined reference signal power; and
    (c) adjustment means, operatively coupled to the difference means, for adjusting a signal power control threshold as a function of the difference signal.

2. The apparatus of claim 1 wherein the estimating means generates an estimate of the power of a received signal by averaging a plurality of the signal power estimates together.

3. The apparatus of claim 1 further comprising a power control means, operatively coupled to the adjustment means, for setting a power control indicator in response to the result of a comparison between the received signal power estimate and the adjusted power control threshold.

4. The apparatus of claim 3 further comprising a signal transmitting means, operatively coupled to the power control means, for transmitting the power control indicator over a communication channel.

5. The apparatus of claim 4 wherein the signal transmitting means comprises means for preparing the power control indicator for transmission over the communication channel by spreading the power control indicator with a spreading code prior to transmission over the communication channel.

6. The apparatus of claim 4 wherein the communication channel is selected from the group consisting essentially of an electronic data bus, radio communication link, wireline and optical fiber link.

7. The apparatus of claim 4 further comprising:
    (a) signal receiving means for detecting a power control indicator within a signal received from over the communication channel; and
    (b) power adjustment means, operatively coupled to the signal receiving means, for adjusting a particular signal transmission power of a signal transmitter in response to the detected power control indicator.

8. The apparatus of claim 7 wherein the signal receiving means comprises means for despreading the received signal with a spreading code to detect the power control indicator.

9. The apparatus of claim 1 wherein the adjustment means adjusts the signal power control threshold according to the following function:

$$THR(n) = THR(n-1) + \mu[P_{ref} - \bar{P}(n)]$$

where,
n = a moment in time;
THR(n) = signal power control threshold at time n;

μ = a threshold adaption step size;
$P_{ref}$ = a predetermined reference signal power; and
$\overline{P}(n)$ = an estimated received signal power at time n.

10. A method for maintaining received signal power levels at an average level when a signal power estimate on average is similar to the average of actually received signal power levels, comprising:
   (a) generating an estimate of the power of a received signal;
   (b) generating a difference signal by substracting the estimated received signal power from a predetermined reference signal power; and
   (c) adjusting a signal power control threshold as a function of the difference signal.

11. The apparatus of claim 10 wherein the estimating means generates an estimate of the power of a received signal by averaging a plurality of the signal power estimates together.

12. The method of claim 10 further comprising a step of setting a power control indicator in response to the result of a comparison between the received signal power estimate and the adjusted power control threshold.

13. The method of claim 12 further comprising a step of transmitting the power control indicator over a communication channel.

14. The method of claim 13 wherein the step of transmitting comprises preparing the power control indicator for transmission over the communication channel by spreading the power control indicator with a spreading code prior to transmission over the communication channel.

15. The method of claim 10 wherein the communication channel is selected from the group consisting essentially of an electronic data bus, radio communication link, wireline and optical fiber link.

16. The method of claim 13 further comprising the steps of:
   (a) detecting a power control indicator within a signal received from over the communication channel; and
   (b) adjusting a particular signal transmission power of a signal transmitter in response to the detected power control indicator.

17. The method of claim 16 wherein the step of detecting comprises despreading the received signal with a spreading code to detect the power control indicator.

18. The method of claim 10 wherein the signal power control threshold is adjusted according to the following function:

$$THR(n) = THR(n-1) + \mu[P_{ref} - \overline{P}(n)]$$

where,
n = a moment in time;
THR(n) = signal power control threshold at time n;
μ = a threshold adaption step size;
$P_{ref}$ = a predetermined reference signal power; and
$\overline{P}(n)$ = an estimated received signal power at time n.

19. An apparatus for maintaining received signal power levels at an average level when a signal power estimate on average is similar to the average of actually received signal power levels, comprising:
   (a) estimating means for generating an estimate of the power of a received signal;
   (b) difference means, operatively coupled to the estimating means, for generating a difference signal by subtracting the estimated received signal power from a predetermined reference signal power;
   (c) adjustment means, operatively coupled to the difference means, for adjusting a signal power control threshold as a function of the difference signal;
   (d) power control means, operatively coupled to the adjustment means, for setting a power control indicator in response to the result of a comparison between the received signal power estimate and the adjusted power control threshold; and
   (e) signal transmitting means, operatively coupled to the power control means, for transmitting the power control indicator over a communication channel.

20. The apparatus of claim 19 further comprising:
   (a) signal receiving means for detecting a power control indicator within a signal received from over the communication channel; and
   (b) power adjustment means, operatively coupled to the signal receiving means, for adjusting a particular signal transmission power of a signal transmitter in response to the detected power control indicator.

21. The apparatus of claim 19 wherein the adjustment means adjusts the signal power control threshold according to the following function:

$$THR(n) = THR(n-1) + \mu[P_{ref} - \overline{P}(n)]$$

where,
n = a moment in time;
THR(n) = signal power control threshold at time n;
μ = a threshold adaption step size;
$P_{ref}$ = a predetermined reference signal power; and
$\overline{P}(n)$ = an estimated received signal power at time n.

22. A method for maintaining received signal power levels at an average level when a signal power estimate on average is similar to the average of actually received signal power levels, comprising:
   (a) generating an estimate of the power of a received signal;
   (b) generating a difference signal by subtracting the estimated received signal power from a predetermined reference signal power;
   (c) adjusting a signal power control threshold as a function of the difference signal
   (d) setting a power control indicator in response to the result of a comparison between the received signal power estimate and the adjusted power control threshold; and
   (e) transmitting the power control indicator over a communication channel.

23. The method of claim 22 further comprising the steps of:
   (a) detecting a power control indicator within a signal received from over the communication channel; and
   (b) adjusting a particular signal transmission power of a signal transmitter in response to the detected power control indicator.

24. The method of claim 22 wherein the signal power control threshold is adjusted according to the following function:

$$THR(n) = THR(n-1) + \mu[P_{ref} - \overline{P}(n)]$$

where,
n = a moment in time;
THR(n) = signal power control threshold at time n;
μ = a threshold adaption step size;
$P_{ref}$ = a predetermined reference signal power; and
$\overline{P}(n)$ = an estimated received signal power at time n.

* * * * *

UNITED STATES PATENT AND TRADEMARK OFFICE
CERTIFICATE OF CORRECTION

PATENT NO. : 5,216,692
DATED : June 1, 1993
INVENTOR(S) : Ling

It is certified that error appears in the above-identified patent and that said Letters Patent is hereby corrected as shown below:

In the Claims:

Col. 8, Line 63, "$THR(n)=THR(n - 1)+u[P_{ref} - P(n)]$" should be --$THR(n)=THR(n - 1)+\mu[P_{ref} - \overline{P}(n)]$--.

Col. 9, please delete Claim 11 and replace with new Claim 11 --The method of claim 10 wherein the step of generating the estimated received signal power comprises generating an estimate of the power of a received signal by averaging a plurality of the signal power estimates together.--

Col. 9, line 52, "$THR(n)=THR(n - 1)+u[P_{ref} - P(n)]$" should be --$THR(n)=THR(n - 1)+\mu[P_{ref} - \overline{P}(n)]$--.

Col. 10, line 26, "$THR(n)=THR(n - 1)+u[P_{ref} - P(n)]$" should be --$THR(n)=THR(n - 1)+\mu[P_{ref} - \overline{P}(n)]$--.

Col.10, line 63, "$THR(n)=THR(n - 1)+u[P_{ref} - P(n)]$" should be --$THR(n)=THR(n - 1)+\mu[P_{ref} - \overline{P}(n)]$--.

Signed and Sealed this

Seventeenth Day of May, 1994

Attest:

BRUCE LEHMAN

*Attesting Officer*     *Commissioner of Patents and Trademarks*